United States Patent Office 2,953,540
Patented Sept. 20, 1960

2,953,540
COMPOSITION COMPRISING A THERMOPLASTIC RESIN AND KETO-ACID ESTER PLASTICIZER

Elmer J. De Witt, Akron, and Seward J. Averill, Boston, Ohio, assignors to The B. F. Goodrich Company, New York, N.Y., a corporation of New York No Drawing. Filed Apr. 3, 1958, Ser. No. 726,039
9 Claims. (Cl. 260—32.2)

This invention relates to plasticized resin compositions and to new monocarboxylic keto-acid ester plasticizers and more particularly pertains to vinylidene resin compositions plasticized with keto-acid esters of certain branched chain alcohols and to the keto-acid esters which are liquid at room temperature. Vinylidene halide resins plasticized with keto-acid esters of this invention are exceptionally stable against heat and light degradation.

We have found that esters of branched chain alkanols having from 8 to 12 carbon atoms and keto-fatty acids having from 14 to 32 carbon atoms, which esters are liquid at room temperature, are excellent plasticizers and heat stabilizers for polyvinyl chloride, poly(vinylidene chloride) copolymers of vinyl chloride and vinylidene chloride or copolymers of vinyl chloride or vinylidene chloride and another monoolefinically unsaturated monomer.

The generic structure of the esters is

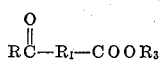

in which R represents an aliphatic hydrocarbon group of from 3 to 13 carbon atoms, preferably an alkyl group, $R_1$ is a divalent aliphatic hydrocarbon group having at least 5 carbon atoms between the carbonyl and ester group, preferably an alkylene group, and $R_3$ is the alkyl residue of the branched chain alcohols having from 8 to 12 carbon atoms. The esters of the invention are further characterized by being liquid at room temperature and preferably at temperatures of 15° C. or below.

By addition of organic acids to the double bonds of unsaturated fatty acids, saponification of the addition products, followed by acidification, hydroxy fatty acid compounds may be prepared. Such preparations are fully described in U.S. Patent No. 2,759,953, issued August 21, 1956. Controlled oxidation of hydroxy fatty acids yield keto-fatty acids by processes known to the art.

We have found that such esters possess an unusually high affinity for the resins; that they are easily incorporated into the resins at elevated temperatures to give a soft, plastic, easily processed composition; that they are compatible with the resins under a wide variety of service conditions and for long periods of time; and that they impart to the resins a number of useful properties, one of the most outstanding of which is the ability of the resins to remain flexible and free of substantial discoloration after extended exposure to the degrading influence of heat and light, especially heat.

Compositions comprising vinyl resins and a keto-fatty acid ester plasticizer, as defined above, are unique in that they are processible at temperatures in the range of 300 to 320° F., do not discolor when retained at such temperatures for periods of up to two hours or more, and are flexible at temperatures as low as —40° C. if cooled rapidly. This combination of properties is not found in vinyl resins plasticized with known plasticizers; rather, when using plasticizers of the prior art, it has been observed that compositions which are flexible at temperatures of —30° C. and which can be processed at temperatures above 300° F. almost invariably require the addition of metallic salts such as cadmium, strontium or barium salts to protect the resins against the degrading effects of the elevated temperature.

The compositions of this invention are prepared in the usual manner by admixing the keto-fatty acid ester with the resin on a roll mill or in an internal mixer, such as a Banbury or Werner Pfleiderer mixer, or by adding the keto-fatty acid ester to latices of the resins, or to emulsions of the resin-forming monomers prior to polymerization, or to solutions of the resins in solvent, or by any other desired method, it being understood that any of the various methods of incorporating a plasticizer into a resin is applicable. The amount of the keto-fatty acid ester that can be blended with the resins varies widely. Compositions containing from 10 parts or slightly less to 150 parts or more of the keto-fatty acid ester for each 100 parts of the resin all possess improved heat and light stability, and the use of 70 to 80 parts of the plasticizer for each 100 parts of resin is preferred for most purposes.

Monobasic keto-fatty acids which can be esterified to prepare esters, within the purview of the general formula above, may be either saturated or unsaturated, substituted or unsubstituted in nature. Among such acids are: saturated keto aliphatic acids such as 7-keto dodecanoic, 9-keto dodecanoic, 7-keto tetradecanoic, 9-keto tetradecanoic, 9-keto hexadecanoic, 9-keto octadecanoic, 7-keto octadecanoic, 9-keto eicosanoic, 11-keto eicosanoic, 11-keto docosanoic, 13-keto docosanoic;

Unsaturated keto aliphatic acids such as 9-keto-12-octadecenoic, and 12-keto-9-octadecenoic acids.

Mixtures of keto-fatty acids made from naturally occurring fatty acids and their glycerides can also be employed. Thus, such fatty acid mixtures as soya oil, cocoanut oil, cotton seed oil, fish oil, linseed oil, castor oil, tall oil and other unsaturated fatty acids of vegetable or animal origin can be acylated and hydrolyzed and then oxidized to form keto-acids which are useful for preparing ester type plasticizers of this invention.

The preferred esters are those obtained by esterifying aliphatic keto stearic acids, wherein the carbonyl group is from 7 to 13 carbon atoms removed from the carboxyl group, with monohydric branched chain alkanols mentioned above.

Among the materials which may be plasticized and stabilized against the degrading effect of heat and light with the branched chain esters of keto-fatty acids are poly(vinyl chloride), poly(vinylidene chloride), poly(vinyl bromide), poly(vinyl fluoride) and copolymers of predominant amount of vinyl chloride, bromide or fluoride with one or more other polymerizable unsaturated compounds containing a single olefinic double bond such as vinyl acetate, vinylidene chloride, vinylidene bromide, styrene, acrylonitrile, methyl acrylate, ethyl acrylate, methyl methacrylate, methyl chloroacrylate, ethyl cyano acrylate, diethyl fumarate, diethyl chloromaleate, isobutyl crotonate, vinyl isobutyl ether, vinyl methyl ketone, vinyl benzoate, vinyl butyrate, vinyl furane, vinyl pyridine, nuclear substituted dichlorostyrene, isobutylene, ethylene and the like. All such polymeric materials are polymers of vinyl halides and are preferably used in preparing the keto-fatty acid ester plasticized resins of this invention especially when the polymer contains a predominant amount of polymerized vinyl or vinylidene halide. In short, any of the thermoplastic resins derived by the polymerization of monomeric vinyl or vinylidene halides with monomeric materials containing a single olefinic bond may be used in this invention.

In the specific examples, esters of 9-keto stearic acid, 10-keto stearic acid and 12-keto stearic acid are used to plasticize and stabilize polyvinyl chloride, it being understood that generally equivalent effects are secured when other vinylidene chloride polymers or copolymers of vinyl or vinylidene halides with other monoolefinic monomers are substituted for polyvinyl chloride. In the examples, all parts are by weight.

Example I 30 parts of powdered polyvinyl chloride and 20 parts of a mixture of 2-ethyl hexyl-9-keto stearate and 2-ethyl hexyl-10-keto stearate, obtained by acylating oleic acid, hydrolyzing and oxidizing the hydroxy oleic acid to a mixture of 9 and 10 keto stearic acids and then esterifying the mixture with 2-ethyl hexanol were mixed together in a container to form a dough-like mix. This mixture was then placed on a two roll mixing mill at about 240° F. and its behavior observed as the temperature of the mill increased. When a temperature of 320° F. was reached the plasticizer and the polyvinyl chloride were compatible. After plasticization was complete, the stock was sheeted off the mill and molded at 350° F. into a sheet of approximately 0.020 inch thickness. The sheet was allowed to cool to room temperature, and after five months the sheet remained flexible, uncolored and was not greasy to the touch. Another sample was tested for low temperature flexibility and it was found that the plasticized composition was flexible at temperatures as low as −45° C. when cooled rapidly. Other samples were tested for tensile strength, elongation and were found to be equal to or better than polyvinyl chloride plasticized by dioctyl phthalate. Another sample was tested for heat and light stability in a weatherometer and after seven days was only slightly discolored, while the control polyvinyl chloride plasticized with dioctyl phthalate after seven days was black and brittle. The 2-ethyl hexyl ester of the 9 and 10-keto stearic acids had a solidification temperature or melting temperature of about 11–13° C. When 2-ethyl hexyl-12-keto stearate is used in place of the mixture of 9 and 10-keto stearic acid esters described above substantially comparable results are obtained. The solidification temperature of the 2-ethyl hexyl-12-keto stearate was about 9° C.

Example II

A mixture of 22.8 parts of poly(vinyl chloride) and 15 parts of 2,4,4-trimethylpentyl-12-keto stearate was worked on a 2 roll mill at 320–330° F. for 20 minutes. Sheets 6 x 6 inches and .02 inch thick were pressed at 350° F. for five minutes. The sheets had a tensile strength of 1990 pounds per square inch, an 250% elongation at break, a 100% modulus of 920 pounds per square inch and a heat loss in 4 days at 90° C. of only 1.54%. No bleeding from the sheet was apparent after three months at room temperature. The n-butyl esters of either 12-keto stearic acid or a mixture of 9 and 10-keto stearic acids bloom very noticeably to form opaque films almost immediately after processing.

Example III

An ester which was liquid at room temperature was prepared from a technical grade of 8-methyl nonanol and 12-keto stearic acid. The nonanol contained small quantities of 6-methyl heptanol and 10 methyl undecanol, such that the alcohol analyzed an average of about 9.5 carbon atoms. A mixture of 22.8 parts of poly(vinyl chloride) and 15 parts of the ester was worked on a 2 roll mill for 20 minutes at a temperature of 320–330° F. Sheets 6 in. x 6 in. x .02 in. were pressed at 350° F. for 5 minutes. The tensile strength of the sheets was 2050 pounds per square inch, the elongation at break was 325%, the 100% modulus was 790 pounds per square inch and the heat aging showed a loss of only .58% after 4 days at 90° C. The sheets showed no bleeding of plasticizer on standing at room temperature for 3 months.

The alcohols used for preparing the esters of this example were made by treating triisobutyl aluminum with ethylene in the presence of aluminum chloride, oxidizing the trialkyl aluminum compound and then hydrolyzing the oxidized product with 6 N HCl.

Similar improvements in plasticization and heat and light stability are obtained when other keto-fatty acid esters are mixed with polyvinyl chloride and other vinyl halide resins set out hereinbefore.

In addition to the resin and the plasticizer, the compositions of this invention may be combined with pigments, fillers, colors, and solvents. Either a single plasticizer may be used or a mixture with other plasticizers and heat and light stabilizers known to the art can be added. These and other variations in compounding of resin formulations using the keto-fatty acid ester plasticizers of this invention, including variations in proportions, will be apparent to those skilled in the art and are within the spirit and scope of the appended claims.

We claim:

1. A plasticized thermoplastic resin having improved heat and light stability, comprising a resin selected from the class consisting of polyvinyl chloride, polyvinylidene chloride and copolymers of vinyl chloride and vinylidene chloride and as a plasticizer for said resin an ester corresponding to the generic formula

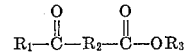

in which $R_1$ represents an aliphatic hydrocarbon radical of from 3 to 13 carbon atoms, $R_2$ represents an unsubstituted divalent aliphatic hydrocarbon radical having at least 5 carbon atoms between the carbonyl and the ester carbon atoms, and $R_3$ is the organic radical of a branched chain monohydric alkanol having from 8 to 12 carbon atoms, said ester being liquid at 25° C.

2. The composition of claim 1 in which the resin is poly vinyl chloride.

3. The composition of claim 1 in which the resin is poly vinylidene chloride.

4. The composition of claim 1 in which the resin is a copolymer of vinyl chloride and vinylidene chloride.

5. A composition comprising a resin selected from the class consisting of polyvinyl chloride, polyvinylidene chloride and copolymers of vinyl chloride and vinylidene chloride and from 10 to 150 parts by weight based on the polymer of an ester of a monohydric branched chained alkanol having from 8 to 12 carbon atoms and 12-keto stearic acid, said ester being liquid at 25° C.

6. A composition comprising a resin selected from the class consisting of polyvinyl chloride, polyvinylidene chloride and copolymers of vinyl chloride and vinylidene chloride and from 10 to 150 parts by weight based on the polymer of esters of a monohydric branched chain alkanol having from 8 to 12 carbon atoms and a mixture of 9-keto and 10-keto stearic acids, said esters being liquid at 25° C.

7. A composition comprising a resin selected from the class consisting of polyvinyl chloride, polyvinylidene chloride and copolymers of vinyl chloride and vinylidene chloride and from 70 to 80 parts by weight based on the polymer of an ester of a monohydric branched chain alkanol having from 8 to 12 carbon atoms and 12-keto stearic acid, said ester being liquid at 25° C.

8. A composition comprising a resin selected from the class consisting of polyvinyl chloride, polyvinylidene chloride and copolymers of vinyl chloride and vinylidene chloride and from 70 to 80 parts by weight based on the polymer of an ester of a monohydric branched chain alkanol having from 8 to 12 carbon atoms and an ester of 9-keto stearic acid, said ester being liquid at 25° C.

9. A composition comprising a resin selected from the class consisting of polyvinyl chloride, polyvinylidene chloride and copolymers of vinyl chloride and vinylidene chloride and from 70 to 80 parts by weight based on the polymer of an ester of a monohydric branched chain alkanol having from 8 to 12 carbon atoms and 10-keto stearic acid, said ester being liquid at 25° C.

References Cited in the file of this patent

UNITED STATES PATENTS

| | | |
|---|---|---|
| 2,180,730 | Cox | Nov. 21, 1939 |
| 2,838,467 | Dobay | June 10, 1958 |